US005171507A

United States Patent [19]

Del Zotto

[11] Patent Number: 5,171,507

[45] Date of Patent: Dec. 15, 1992

[54] METHOD FOR CASTING A RESILIENT BULKHEAD GASKET

[76] Inventor: William M. Del Zotto, 2300 Commonwealth Ave., Duluth, Minn. 55808-1699

[21] Appl. No.: 791,267

[22] Filed: Nov. 13, 1991

[51] Int. Cl.[5] .......... B28B 13/06; E04B 1/16; F16J 9/00; F16L 3/00

[52] U.S. Cl. .......... 264/219; 264/32; 264/35; 264/229; 264/274; 264/278; 264/279; 264/334; 277/207 A; 285/64

[58] Field of Search .......... 264/31-36, 264/274, 275, 278, 279, 334, 219, 229; 277/207 R, 207 A, 210; 285/64

[56] References Cited

U.S. PATENT DOCUMENTS

| | | | |
|---|---|---|---|
| 3,727,876 | 4/1973 | Keyser | 264/274 X |
| 3,815,214 | 6/1974 | Kyle, Sr. | 264/274 X |
| 3,832,438 | 8/1974 | Ditcher | 264/274 |
| 3,874,063 | 4/1975 | Skinner et al. | 264/274 X |
| 4,073,048 | 2/1978 | Ditcher | 264/35 X |
| 4,103,901 | 8/1978 | Ditcher | 277/207 A X |
| 4,333,662 | 6/1982 | Jones | 277/207 A |
| 4,350,351 | 9/1982 | Martin | 277/207 A |
| 4,387,900 | 6/1983 | Ditcher et al. | 277/207 A X |
| 4,625,976 | 12/1986 | Gilbert | 277/207 A X |
| 4,693,482 | 9/1987 | Daigle et al. | 277/207 A |
| 4,801,417 | 1/1989 | Ditcher | 264/32 X |
| 4,805,920 | 2/1989 | Gavin | 277/207 A |
| 4,842,785 | 6/1989 | Daigle et al. | 264/274 X |
| 4,951,914 | 8/1990 | Meyers et al. | 277/207 A X |
| 4,991,858 | 2/1991 | Abila et al. | 277/207 A X |
| 4,997,215 | 3/1991 | Fournier | 264/275 X |

*Primary Examiner*—Karen Aftergut
*Attorney, Agent, or Firm*—Douglas L. Tschida

[57] ABSTRACT

An annular, elastomer bulkhead gasket for sealing pipe fittings at concreate structures. A tubular body portion includes an annular casting flange having a three-quarter radiused peripheral edge which radially projects from an outer surface. A half radiused annular bead projects from an inner surface to seal around a fitted pipe. The gasket is securable to an annular flange of a conically tapered mandrel which is securable to a casting form wall. The mandrel retains and supports the gasket in compresed relation between the casting form walls during the pouring of the bulkhead.

3 Claims, 4 Drawing Sheets

METHOD FOR CASTING A RESILIENT BULKHEAD GASKET

BACKGROUND OF THE INVENTION

The present invention relates to elastomer seals and, in particular, to a pipe seals cast into concrete bulkheads, including septic tanks and manhole bases.

A common problem which occurs during underground construction is that of having to provide a watertight seal between a pipe member at the point of entry to a bulkhead. Such a problem can occur at septic tanks, manhole bases or varieties of other plumbing or electrical junction boxes.

Numerous styles and types of seals have been developed to resolve this difficulty. Many of such seals provide for a wedge fitting of the seal to the bulkhead. That is, a conical seal is fit about the pipe, before or after being inserted into the bulkhead. Sealing occurs with the driving of the tapered seal into the port.

Other seals known to applicant are formed undersized and include mechanisms to expand the seal walls, once inserted into an opening. Still other seals have been developed which can be cast directly into the bulkhead wall and which expand and contract about the pipe as it is inserted through the seal.

The present invention is directed to a seal of the latter type, which particularly finds application in concrete septic tanks or manhole bases. The inside diameter of such seals can range between a matter of a few inches to several feet, depending upon the outside wall diameter of the pipe.

To the extent applicant is aware of cast seals, the seals are typically supported on a mandrel and positioned approximately midway between form walls which define the bulkhead wall. Most commonly, a split or two piece mandrel is used having two mating cupped halves which restrain the seal. A separate restraint mechanism secures the mandrel to the bulkhead and seals the ends of the mandrel between the form walls. The mandrel may also pass through aligned holes formed into the casting form. Alternatively, the mandrel may be assembled and secured to a reinforcement wireform assembly which is cast as part of the bulkhead and prior to positioning the casting forms about the wireform.

Another assembly of which applicant is aware provides a cylindrical mandrel which supports a cylindrical seal between a pair of end retainers. The mandrel is positionable relative to the form via a slotted mandrel corepiece. A fastener extends through a slot in the corepiece to secure the mandrel to a form wall. The form walls otherwise abut the end retainers.

Although the foregoing devices provide adequate sealing, the mandrels are rather elaborate in construction. Depending on the number and sizes of pipe openings which must be formed, rather significant expenses can be incurred in forms alone. Setup time to form each sealed port can also be significant. To offset these expenses, Applicant has developed an inexpensive plastic mandrel which supports a seal in compressed relation between the casting form walls and such that a radially projecting flange is set into the poured concrete bulkhead.

SUMMARY OF THE INVENTION

It is accordingly a primary object of the present invention to provide a method and apparatus for supporting a seal to be cast into a bulkhead in predetermined orientation to the walls of a casting form.

It is a further object of the invention to provide a conically tapered mandrel.

It is a further object of the invention to provide a mandrel including a cylindrical flange end for receiving and supporting the seal member at one end and such that the seal compresses upon erecting the form walls on either side of the mandrel.

It is a further object of the invention to provide a mandrel including a threaded bore which mates with a threaded retainer that is insertable through a form wall.

It is a further object of the invention to provide a cylindrical seal wherein at least one flange having a shaped circumferential edge radially extends from an outer surface and an annular projection extends from a through bore to seal against a pipe fit therefore.

Various of the foregoing objects and advantages are particularly obtained in a closed ended mandrel having conically tapered sidewalls. One end wall includes a threaded fastener lug and the tapered sidewall includes an annular flange portion which aligns with the bore of a supported seal.

A tubular seal includes a radially projecting flange having a three-quarter radiused peripheral edge. The flange is cast into the bulkhead wall. A half-radiused annular projection extends from the inner wall surface. The seal is mountable about the mandrel flange such that upon securing the mandrel to a wall of the casting form via a threaded retainer, the seal is compressed between the walls.

Once the bulkhead is cast, a tapered hole is formed which includes an elastomer seal. The hole taper facilitates movement of the retained pipe which in combination with the flexible seal minimizes the likelihood of pipe shear.

Still other objects, advantages and distinctions of the invention will become more apparent upon reference to the following detailed description with respect to the appended drawings. To the extent various modifications and improvements have been considered, they are described as appropriate. The following description should not be interpreted in strict limitation of the invention. Rather the invention should be interpreted within the scope of the appended claims.

DESCRIPTION OF THE PREFERRED EMBODIMENT

Figure 1:
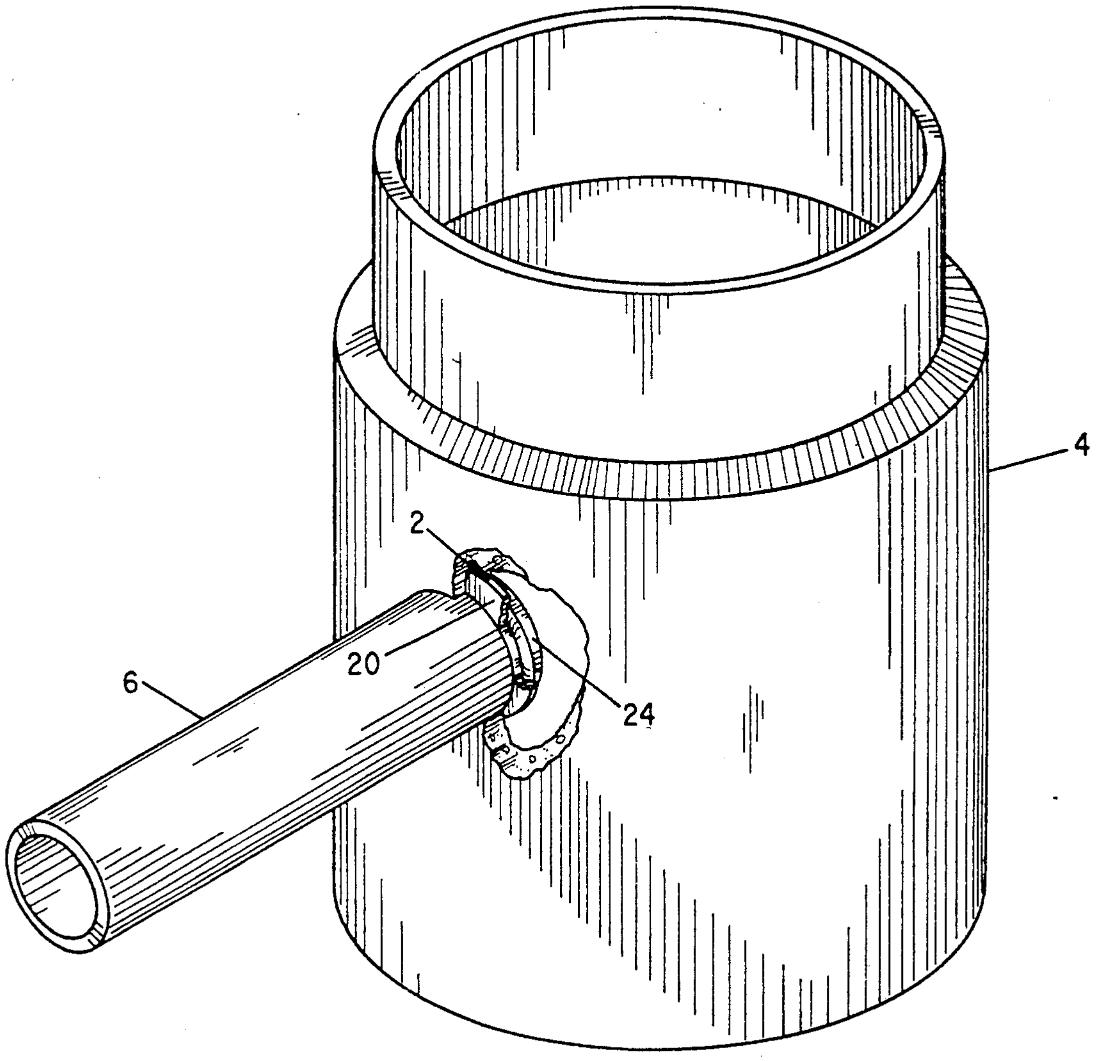
FIG. 1 is a perspective drawing shown in partial cutaway of a typical cast concrete bulkhead wall, such as in a manhole base, including the invention.
Figure 2:
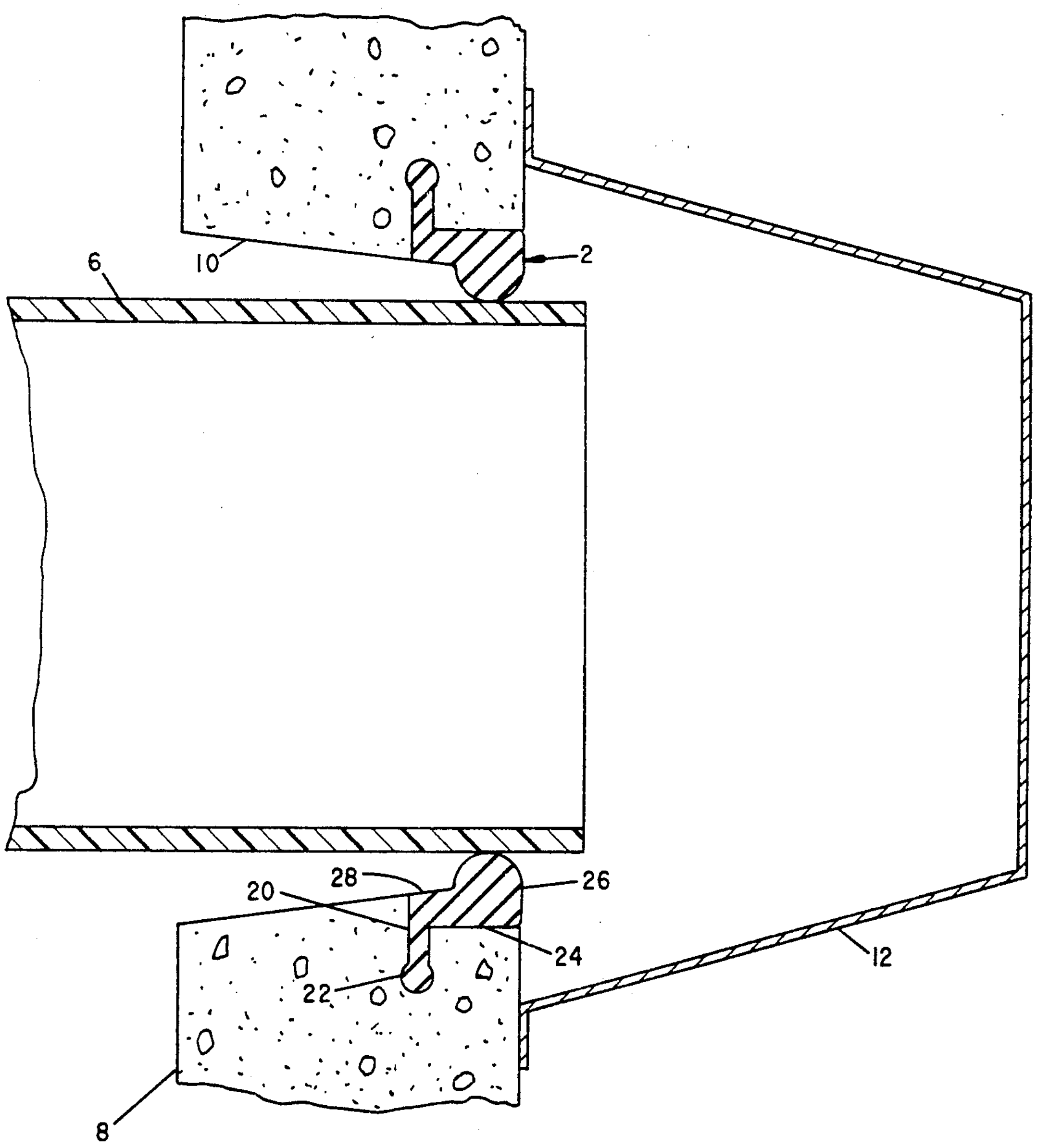
FIG. 2 is a detailed cross section drawing of the seal and assembled pipe.

Referring to FIG. 1, a perspective drawing is shown in partial cutaway of the seal 2 of the present invention cast into a concrete manhole extension or base 4 and wherethrough a suitably sized pipe 6 is inserted. FIG. 2 depicts a cross section view of a pipe 6 as mounted to the bulkhead of a septic tank 8. The piping for a septic system is typically on the order of four to six inches in diameter, whereas piping which fits to a manhole base 4 can range from ten to thirty-six inches. In either event, the pipe 6 is surrounded by the elastomer seal 2, once the pipe is inserted into a conically shaped port 10 and through the seal 2. Depending upon the pipe diameter, the inside diameter of the seal 2 is nominally formed to a slightly smaller diameter. Such undersizing permits flexion of the seal relative to the weight of the pipe which is supported therein and without loss of contact between the seal 2 and pipe 6. Less flexion is typically required with a light weight, small diameter pipe then for larger diameter, heavier pipe.

With the exception of a baffle 12 that is typically aligned with the inlet and outlet ports 10 of a septic system, the bulkhead walls are essentially formed of a cast concrete. Each port 10 provides inwardly tapering, conical side walls which correspond to a casting mandrel to be described with respect to FIGS. 3 and 4. With the greasing and insertion of the pipe 6 through the seal 2, the tapered side walls permit a freedom of movement to the pipe to minimize the effects of shearing forces. That is, settling of the bulkhead or seasonal soil movement can produce forces sufficient to shear the pipe 6.

The seal 2 is cast into the bulkhead wall and restrained via a flange portion 20 which radially projects from one end of the seal 2. An outer peripheral or circumferential edge of the flange 20 provides an annular three-quarter radiused bead 22 and about which the concrete flows and cures to retain the seal to the bulkhead wall. Otherwise, a tubular body portion 24 extends from the flange to the inner surface of the bulkhead wall where an annular half-radiused bead 26 radially extends inward to define the smallest diameter of the seal bore. Although a half-radiused sealing bead 26 is provided, it is to be appreciated other shapes can be used to comparable advantage. For example, either a chamfered or v-shaped annular bead would each flex during pipe insertion, without having sharp edges which might abrade with movement of the pipe. The inside surface of the bore walls 28 may also be tapered as shown or parallel to the outer wall adjacent the flange 20.

Figure 3:
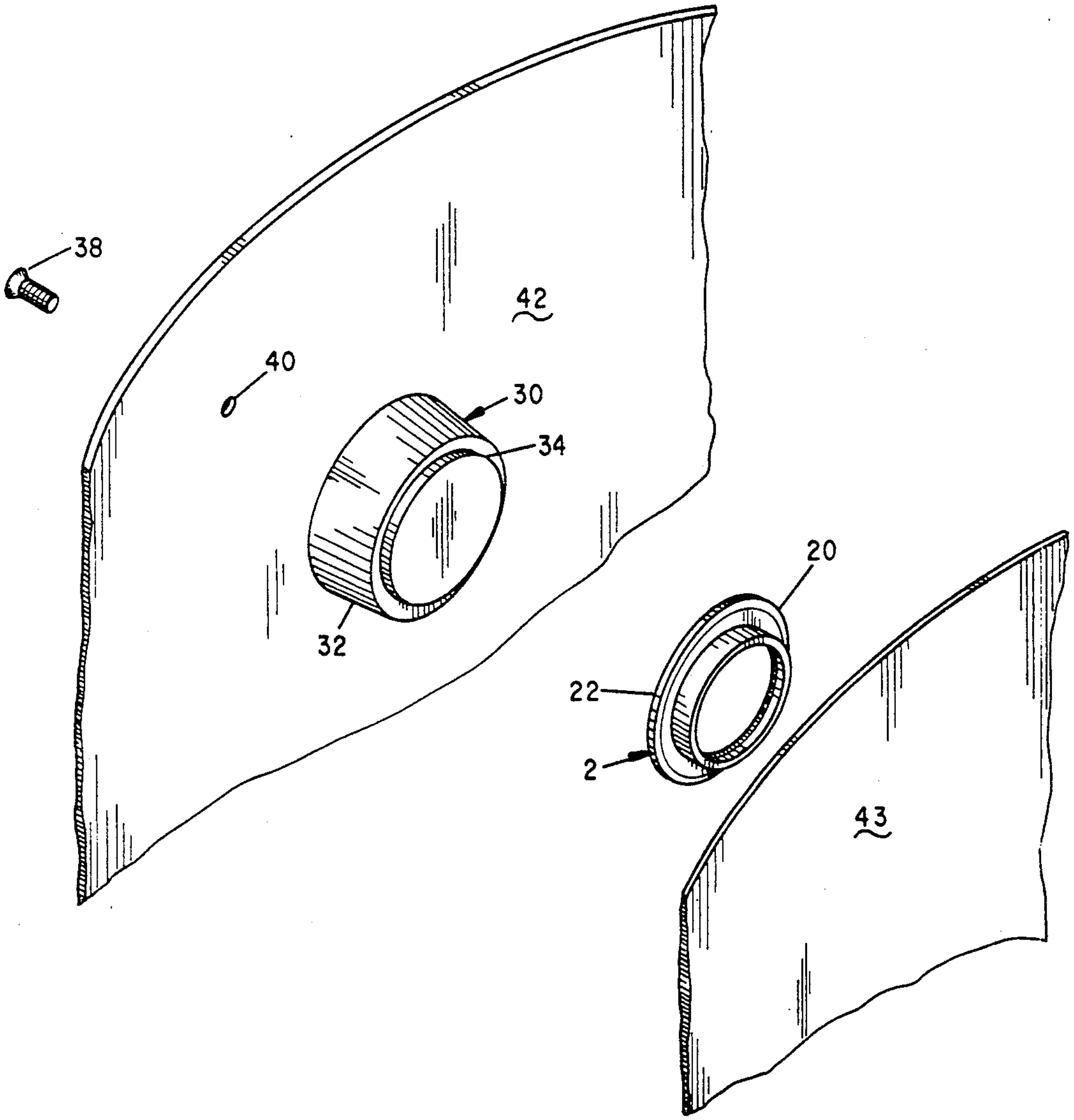
FIG. 3 is a detailed perspective drawing shown in exploded assembly of the mandrel, seal and casting form.
Figure 4:
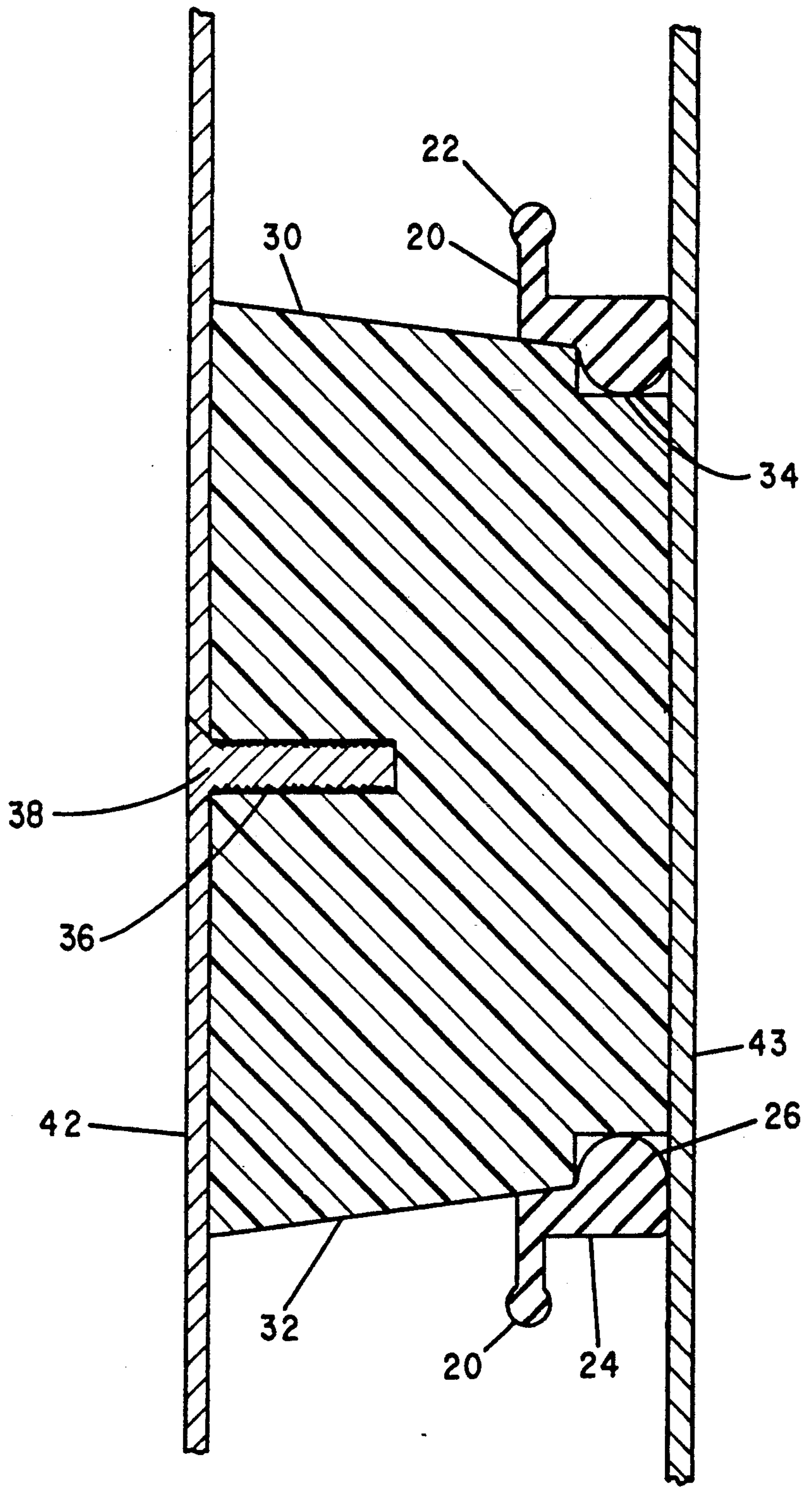
FIG. 4 is a cross section drawing of the mandrel and seal as positioned during bulkhead construction.

Turning attention to FIGS. 3 and 4, an exploded perspective and cross section drawing are shown of the mounting relation of the seal 2 to a support mandrel 30 during casting of the seal 2 into a bulkhead wall. The mandrel 30 is particularly constructed as a rotationally molded plastic part and is shaped to present a conically tapered outer sidewall 32 which terminates at closed end walls. A cylindrical flange 34 is let into the sidewall 32 at one end of the mandrel. A threaded or sleeved insert 36 is cast into the opposite end wall.

During casting, a threaded fastener 38 is inserted through a hole 40 formed in one form wall 42 to retain the mandrel to the form wall. The seal 2 is inserted over the mandrel, with the annular flange 20 bottoming against the mandrel flange 34. The length of the mandrel and mounted seal and spacing between the interior form wall surfaces are sized such that the seal is slightly compressed when the form walls 42, 43 are raised to position. Concrete thus flows about the mandrel 30 and seal 2 to encase the seal 2 and create a non-abrading port 10.

Although a single seal flange 20 is provided, it is to be appreciated multiple flanges may extend from the outer sidewalls of the seal. A single flange has proven adequate for seals accommodating pipes from four to eight inches diameter, although for larger diameter pipe stock additional flanges lend support and better stabilize the seal. Similarly, multiple beads 26 may project from the bore sidewalls to support heavier weight, larger diameter piping.

While the invention has been described with respect to its presently preferred and variously considered alternative embodiments, along with improvements and modifications thereto, it is to be appreciated still other embodiments may suggest themselves to those skilled in the art. Accordingly, the following claims should be interpreted to include all those equivalent embodiments within the spirit and scope thereof.

What is claimed is:

1. A method for forming a cast bulkhead wall having a resilient bulkhead seal cast therein comprising:

a) securing a fastener through an aperture in a first casting form sidewall to a mating insert located in an aft endwall of a mandrel such that said mandrel is fastened to said first casting form sidewall by said fastener and said mating insert, wherein said mandrel includes longitudinally extending sidewalls having a first section which tapers forward from said aft endwall to a flange wall and from which flange wall a second section extends and terminates at a forward endwall, and wherein a diameter of said aft endwall is greater than an outer and inner diameter of said flange wall and greater than a diameter of said forward endwall and said outer and inner diameters of said flange wall are greater than or equal to said diameter of said forward endwall;

b) mounting an annular seal on said mandrel to extend from said second section of said mandrel, wherein said seal has a body, a flange which radially projects from a longitudinal surface of said body away from a bore of said body and an annular bead which radially projects into said bore of said body, such that said first section of said mandrel mounts in said bore of said body along a tapered surface of said bore and said flange wall of said mandrel abuts said annular bead of said body of said seal;

c) positioning a second casting form sidewall opposite said first sidewall to compressively contact said seal such that said annular bead is compressed between said flange wall and said second casting form sidewall, and to restrain said seal between said first and second sidewalls;

d) encasing said seal and mandrel within a concrete slurry admitted between said first and second sidewalls;

e) setting said concrete slurry to form a cast bulkhead wall about said seal; and f) stripping said first and second sidewalls and said mandrel from said cast bulkhead wall having said resilient bulkhead seal cast therein.

2. A method as set forth in claim 1 wherein said bulkhead wall comprises a septic tank.

3. A method as set forth in claim 1 wherein said bulkhead wall comprises a manhole base.

* * * * *